(12) United States Patent
Huang

(10) Patent No.: US 6,496,600 B1
(45) Date of Patent: *Dec. 17, 2002

(54) FONT TYPE IDENTIFICATION

(75) Inventor: Hung Khei Huang, Lake Forest, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 122 days.

(21) Appl. No.: 08/664,575

(22) Filed: Jun. 17, 1996

(51) Int. Cl.[7] .................................................. G06K 9/00
(52) U.S. Cl. ........................................ 382/187; 382/190
(58) Field of Search ................................ 382/187, 191, 382/218, 301, 178, 228, 212, 203, 176

(56) References Cited

U.S. PATENT DOCUMENTS

| | | | |
|---|---|---|---|
| 3,644,889 A | * 2/1972 | Skenderoff et al. | 382/212 |
| 3,694,807 A | * 9/1972 | Bond et al. | 382/178 |
| 5,077,809 A | 12/1991 | Ghazizadeh | 382/33 |
| 5,272,766 A | 12/1993 | Higgins et al. | 382/30 |
| 5,436,983 A | * 7/1995 | Bernzott et al. | 382/228 |
| 5,583,949 A | * 12/1996 | Smith et al. | 382/199 |
| 5,588,072 A | * 12/1996 | Wang | 382/176 |

* cited by examiner

Primary Examiner—Samir Ahmed
(74) Attorney, Agent, or Firm—Fitzpatrick, Cella, Harper & Scinto

(57) ABSTRACT

An optical character recognition system identifies a font type for an image of a block of text. Key characters matching characters in a pre-defined character set are located in the text block. The image of the text block is partitioned into plural image segments where, for example, each image segment is an image of one line of text. Each image segment is evaluated to determine whether the characters in the image segment have fixed pitch or variable pitch. For each key character in the image segments designated as variable pitch, a determination is made whether a gap exists between a left edge of the key character image and the left border of the key character. A font type is identified for the characters in the image data based on the fixed pitch determinations and the gap determinations.

95 Claims, 12 Drawing Sheets

Canon

Canon Information Systems, Inc.
Technical Information Center
Newsletter
Published by Joyce Peluso
April 27, 1992, Volume 2, No.

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:
  (1) Purely capitalistic enterprises that exploit their workers for profit.
  (2) Those where management and labor work closely together to maximize profits, but don't pay enough attention to the community
  (3) A company that both tries to make money but also seeks to fulfill its corporate responsibilities to society, but in a small scale way to a particular country or region.
  (4) A highly evolved type of company that contributes positively to world prosperity.
  Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Color Ink Jet Printer Sales
Source: BIS Strategic Decisions
(thousands of units)

Fig 1: Mr. Hideharu Takemoto

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.
  Mr. Takemoto wants to create a new Canon corporate culture, "The best of American and Japanese cultures must be blended to produce a richer corporate alchemy--a new ideal."
  Canon wants to create more jobs for Americans in the 1990s and to make them an integral part of the Canon family. Mr. Takemoto is further committed to cultivating local talent and moving local executives up through the ranks of Canon's highest corporate echelons.

Canon Develops World's First Ferroelectric Liquid Crystal Display

Source: Wall Street Journal, 10/2/91, Canon Press Release,

In a news conference yesterday, Hiroshi Tanaka, a Canon senior managing director said that the company has succeeded in developing the *world's first* ferroelectric liquid crystal (FLC) display screen. The screen will be test marketed next spring in Canon's EZPS Japanese language DTP system.

Ink-Jet Printer Market Share
Source: Computer Reseller News/Info

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

Canon Information Systems, Inc.                                    Page 1

SERIF (PLAIN)
701
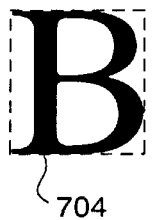
704
SANS SERIF (PLAIN)
702
705
SERIF (ITALIC)
706
707
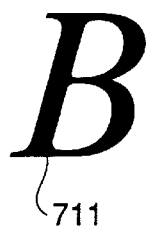
711
712
SANS SERIF (ITALIC)
709
710
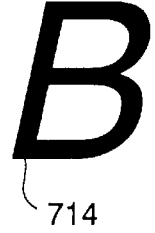
714
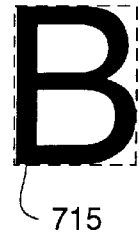
715
FIG. 7

FONT TYPE IDENTIFICATION

BACKGROUND OF THE INVENTION

1. Field of the Invention

The present invention relates to optical character recognition systems and, more particularly, to methods and apparatuses for identifying character font type in an optical character recognition system.

2. Description of the Related Art

Character recognition systems have become widely available in recent years. A conventional character recognition system first obtains a computerized image of a document, such as by scanning in a paper copy of a document, receiving a document image that has been transmitted by facsimile, or obtaining a document image from a server via a local network. Once the document image is obtained, the portions of the document image corresponding to text areas of the document are then analyzed so as to recognize individual characters in those text areas and form a computer readable file containing character codes (e.g., ASCII character codes) corresponding to the recognized characters. Such a file can then be manipulated in word processing, data compression, or other information processing programs.

Conventional character recognition systems are advantageous because they eliminate the need to retype or otherwise reenter text data of the document. However, if an attempt is made to reproduce (such as by printing out) the document based on the computer readable file of character codes, important visual information present in the original document can be lost if font type is not identified as well. For example, FIG. 1 shows a representative document 1 containing various font types, including block 2 containing sans serif proportionally spaced characters, blocks 7 containing serif proportionally spaced characters, and block 5 containing serif fixed pitch characters. A conventional character recognition system would not recognize the differences among these various font types, but instead would reproduce the entire document in a single font, as such shown in FIG. 2.

The problem is especially relevant where the recognition processed document is printed or where, for example to conserve storage space, only the recognition processed document is retained, and the original scanned document is discarded.

SUMMARY OF THE INVENTION

It is therefore an object of the present invention to provide an improved character recognition system that incorporates font type identification techniques.

In one aspect, the present invention uses an image of a character to determine whether the character has a serif font or a sans serif font. A left border is obtained for the image of the character, a determination is made as to whether a gap exists between the character's left edge and its left border, and the font type of the character is identified as serif if a gap exists and sans serif if no gap exist.

In another aspect, the present invention determines a font type for a group of characters from image data that include images of the characters. Key characters are located in the image data, where each key character matches a character in a pre-defined character set. A left border is then obtained for each key character. A determination is made whether a gap exists between the left edge and the left border of each key character. The font type for characters in the image data then is identified based on the gap determination.

In still another aspect, the present invention determines a font type for a group of characters from image data that include images of the characters. Key characters are located in the image data, where each key character matches a character in a pre-defined character set. The image data are partitioned into image segments. For each image segment a determination is made whether the image segment is fixed pitch or variable pitch. A left border is obtained for each key character in the image segments designated as variable pitch. A determination is made whether a gap exists between the left edge and the left border of each key character in the image segments designated as variable pitch. Finally, the font type for characters in the image data is identified based on the gap determination and the fixed pitch determinations.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 1 shows an image of a document page including blocks of text having various font types.

Figure 2:
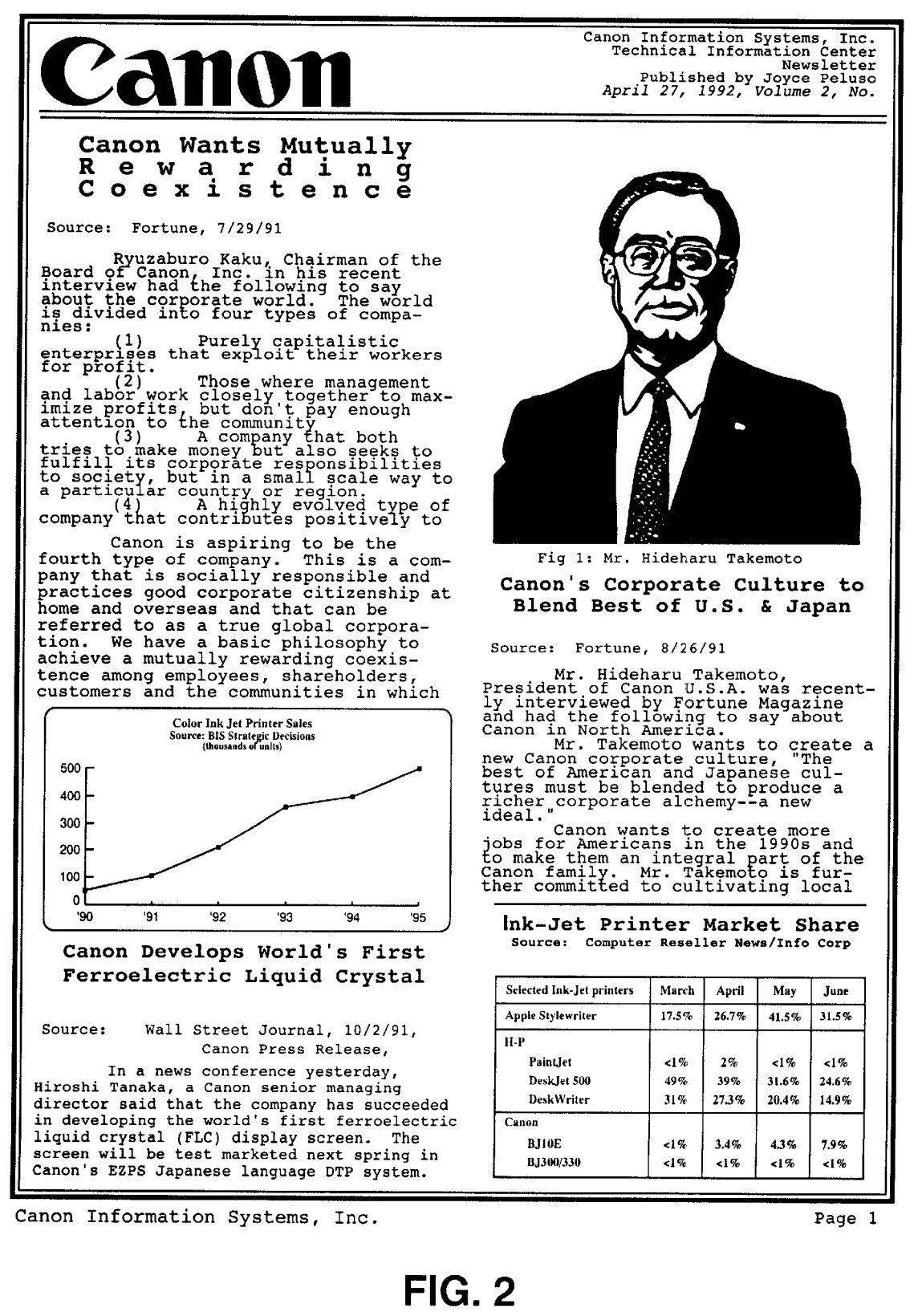

FIG. 2 shows the document image in FIG. 1 recognition processed without font type identification.

FIG. 7 depicts various character images for explaining how italic character slant is removed and rectangular borders are located, according to the present invention.

DETAILED DESCRIPTION OF THE PREFERRED EMBODIMENT

Figure 3:
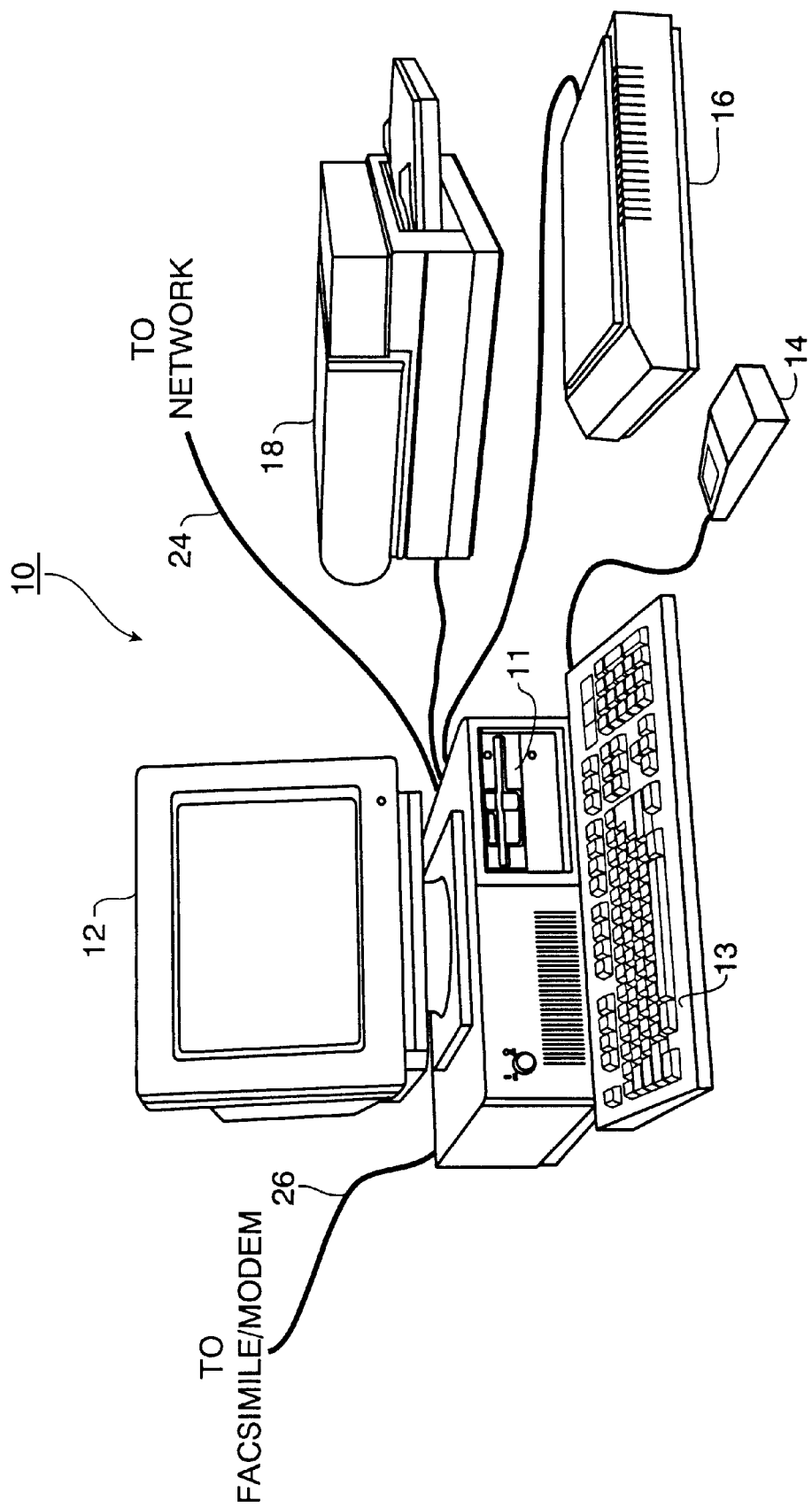
FIG. 3 is a perspective view of computer hardware used in the operation of the character recognition system of the present invention.

FIG. 3 shows the outward appearance of a representative embodiment of the present invention. Shown in FIG. 3 is computing equipment 10, such as a MacIntosh or an IBM PC-compatible computer having a windowing environment, such as Microsoft® Windows. Provided with computing equipment 10 is display screen 12, such as a color monitor, keyboard 13 for entering text data and user commands, and pointing device 14, such as a mouse, for pointing to and manipulating objects displayed on display screen 12.

Computing equipment 10 includes a mass storage device, such as computer disk 11, for storing data files, which can include document image data, text data files, and other data files in compressed or uncompressed format, and for storing application programs such as character recognition programs, font type identification programs, word and spreadsheet processing programs, and other information processing programs. Such application programs contain stored program instructions by which computing equipment 10 manipulates and stores data files on disk 11 and presents data in those files to an operator via the display screen 12 or by printing to printer 18.

Image data is input from scanner 16 which scans documents or other images and provides bit map images of those documents to computing equipment 10. Document image data may also be input into computing equipment 10 from a variety of other sources, either directly or via network interface 24 or facsimile/modem interface 26.

It should be understood that, although a programmable general-purpose computer arrangement is shown in FIG. 1, a dedicated or stand-alone computer or other types of data processing equipment can be used in the practice of the present invention.

Figure 4:
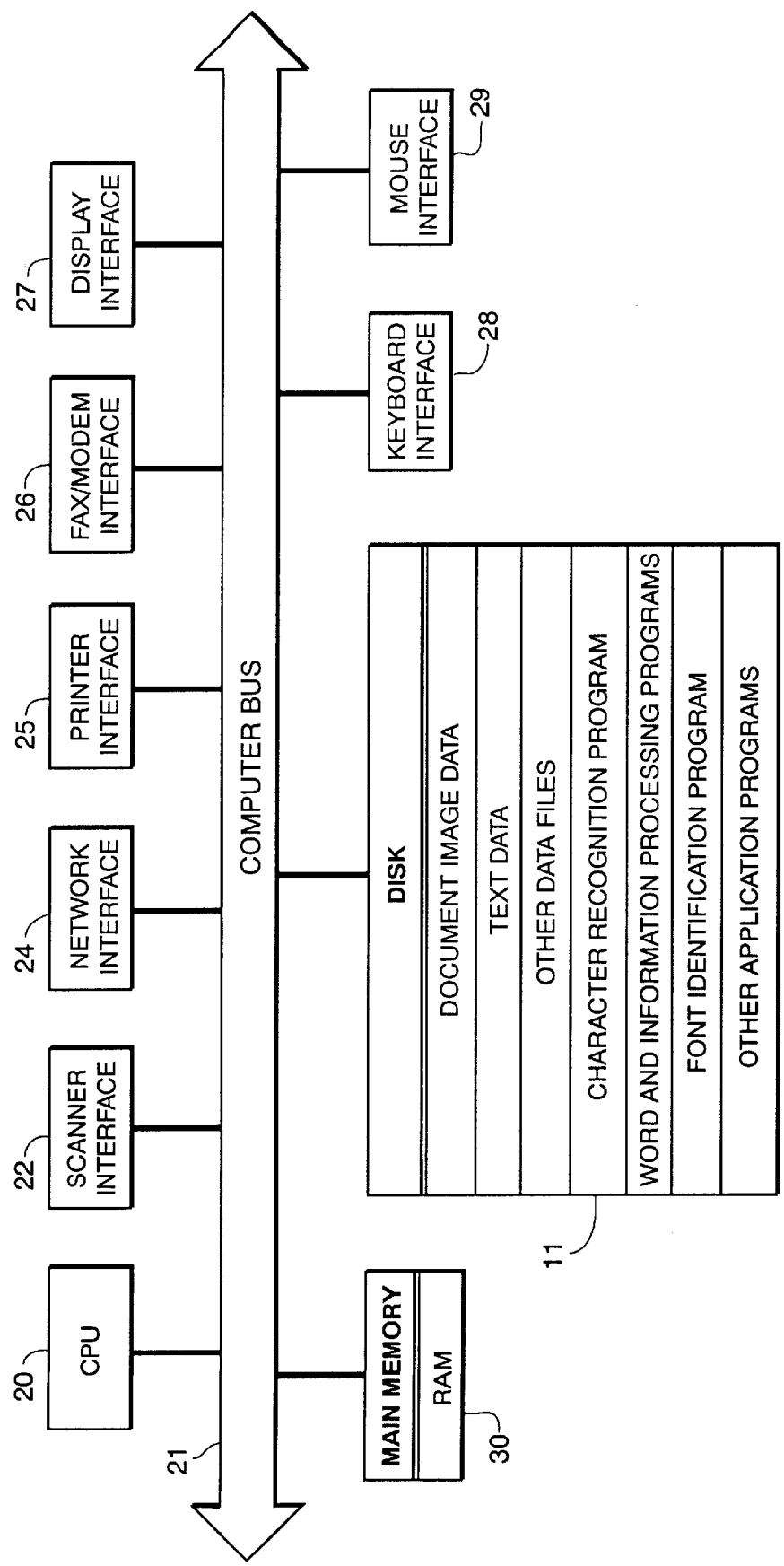
FIG. 4 is a block diagram of the character recognition system depicted in FIG. 3.

FIG. 4 is a detailed block diagram showing the internal construction of computing equipment 10. As shown in FIG. 4, computing equipment 10 includes a central processing unit (CPU) 20 interfaced with computer bus 21. Also interfaced with computer bus 21 is scanner interface 22, network interface 24, printer interface 25, fax/modem interface 26, display interface 27, keyboard interface 28, mouse interface 29, main memory 30 and disk 11.

Main memory 30 interfaces with computer bus 21 so as to provide random access storage for use by CPU 20 when executing stored program instructions, such as character recognition programs, font identification programs, word and information processing programs, and other applications programs. More specifically, CPU 20 loads those programs from disk 11 into main memory 30 and executes those stored programs out of main memory 30.

Figure 5:
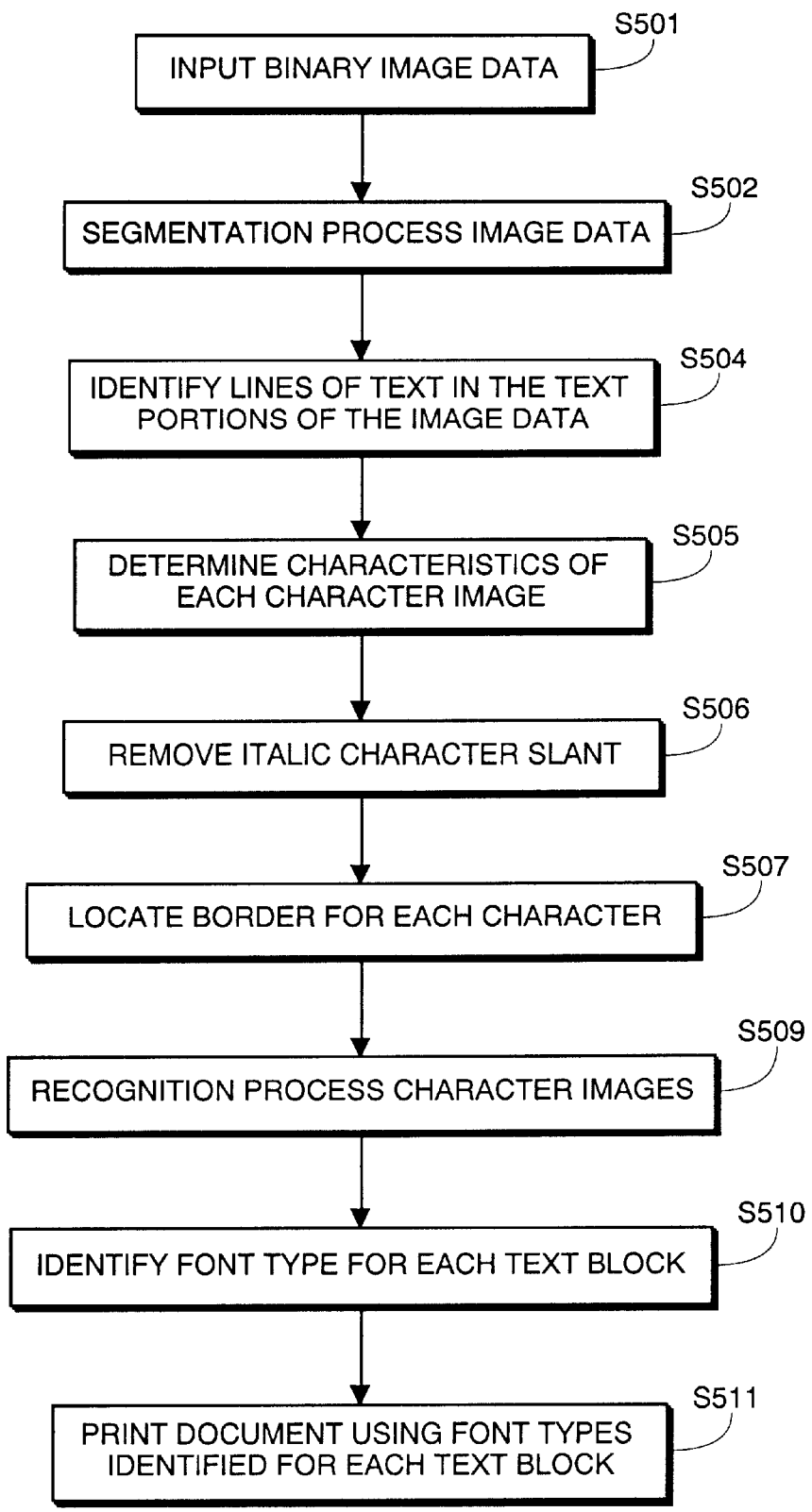
FIG. 5 is a flow diagram of the character recognition system of the present invention.

Operation of the preferred embodiment of the present invention will now be described with reference to FIG. 5. FIG. 5 is a flow diagram showing character recognition processing according to the present invention. Briefly, image data is input; the image data is segmentation processed to distinguish text, line drawing and picture blocks and to obtain images of the individual characters in the text blocks; characteristics such as character slant (i.e., italic/non-italic) are determined for each character image; lines of text in the text blocks are identified; the images of italic characters are processed to remove character slant; a border is located for each character image; each character image is recognition processed to identify the character; a font type is identified for each text block; and a reproduction of the document is created using the font types and the computer readable file of character codes identified in the document.

In more detail, in step S501, binary image data is input, such as by scanning a document on scanner 16 and writing the resulting bit map image into main memory 30.

In step S502, the image data is segmentation processed to identify text blocks (such as text blocks 2, 5 and 7 in FIG. 1) and non-text blocks (such as picture block 9 and line drawing block 8 in FIG. 1). Each of the text blocks is further processed to obtain a separate image of each character in the text block. Preferably, segmentation processing is performed in a manner such as described in commonly-assigned application Ser. No. 08/596,716 filed Feb. 5, 1996, "Method and Apparatus for Selecting Text and/or Non-Text Blocks of Images Stored in a Document", the contents of which are incorporated herein by reference as if set forth in full.

In step S504, each line of text in the text blocks is identified. That is, a separate image is formed for each line of text in the original document.

In step S505, characteristics of each character image are determined. Such characteristics include whether the font style of the character is plain (or upright) or italic, and may also include various characteristics useful in determining the identity of the character. The characteristics determined in this step may be based upon image attributes derived in step S502 and used to distinguish among the different block types.

Identification of font type for a text block is performed in the preferred embodiment of the present invention by subdividing the text block image into multiple segments and separately analyzing each such image segment. Furthermore, in the preferred embodiment each image segment is an image of one line of text (i.e., each text line is separately analyzed and then the results combined with the results for all other text lines). However, the image segments used need not be defined as lines of text, but rather the size and shape of the image segments can be arbitrarily chosen. Therefore, when lines of text are referred to herein, such references should not be considered limiting.

In step S506, the images of those characters identified as italic in step S505 are processed to remove character slant. Referring to FIG. 7, characters 706 and 711 are typical serif characters with an italic font style and characters 709 and 714 are typical sans serif characters with an italic font style. In order to remove character slant, each row of pixels in the character image is left shifted a distance calculated in accordance with the row's vertical distance from the character base and in accordance with the slant angle of italicization. Consequently, pixels at the base of the character remain unshifted and pixels at the top of the character are shifted the farthest left. After removal of italic character slant from characters 706, 711, 709 and 714, the resulting character images are shown in FIG. 7 as characters 707, 712, 710 and 715, respectively.

Returning to FIG. 5, in step S507 a border is located for each character image. In the preferred embodimient, the character image border is a rectangular border with two of the sides parallel to the character baseline. The rectangular border completely circumscribes the character image. That is, the rectangular border is dimensioned no larger than necessary to completely enclose the character pixels. In FIG. 7, the straightened italic characters 707, 712, 710 and 715., as well as the plain font style serif characters 701 and 704 and the plain font style sans serif characters 702 and 705, are shown with circumscribing rectangular borders. Such a rectangular border may be specified for processing purposes by identifying two corner pixels, such as the upper right and lower left pixels, defining the border.

In step S509, each of the character images is recognition processed, using a conventional recognition processing algorithm, in order to determine an identity for the character. In accordance with such determination, a character code (such as an ASCII code) is assigned to the character image.

In step S510, a font type is determined (as described in detail below in connection with FIG. 6) for each text block found in step S502. In step S511, the recognition processed document is printed, with the non-text blocks, such as picture and line drawing blocks, being printed in accordance with scanned bit map images of such blocks, and with the text blocks being printed according to the character codes determined in step S509 and in the font styles and font types identified in steps S505 and S510, respectively.

Figure 6:
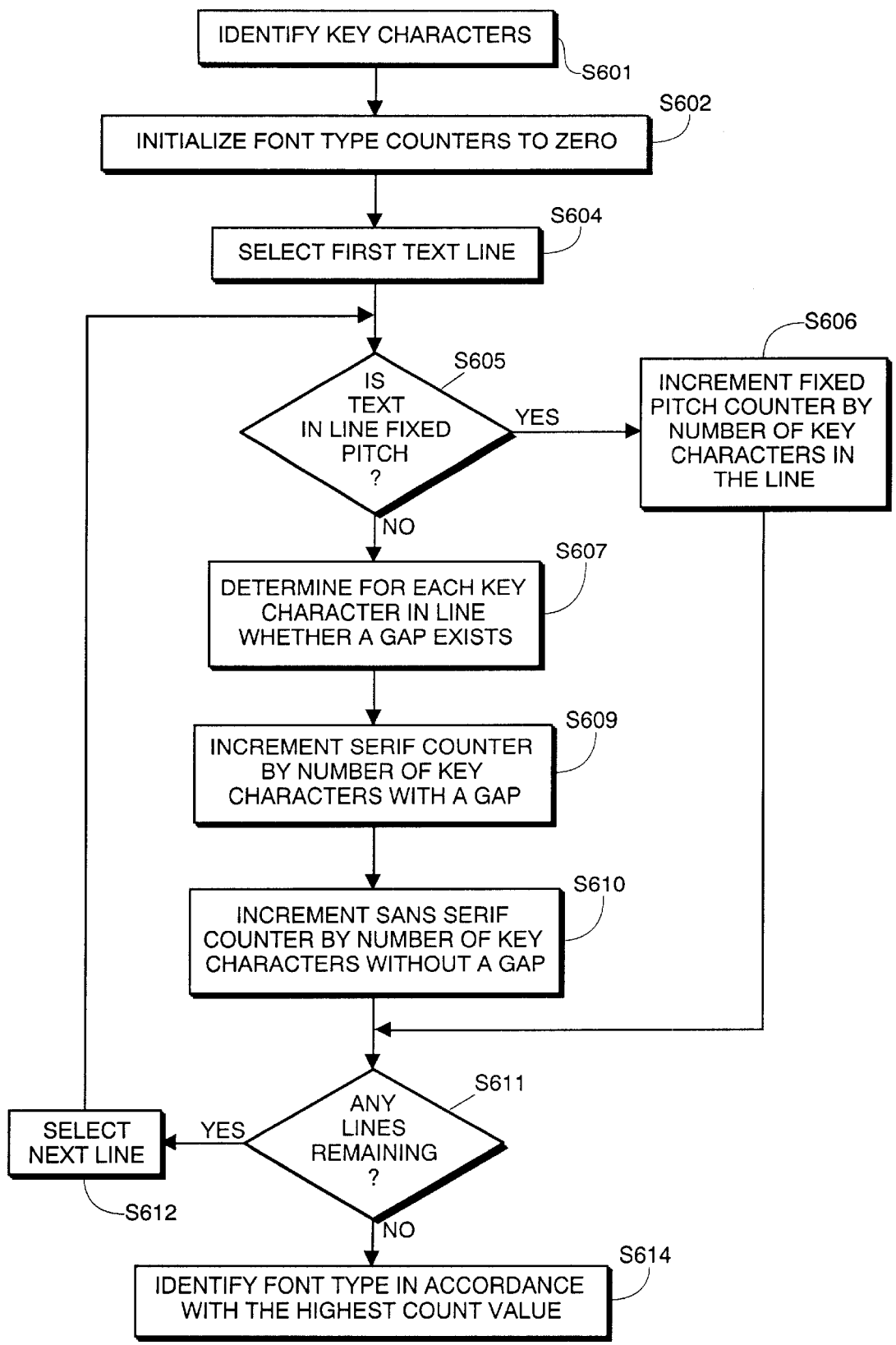
FIG. 6 is a flow diagram of font type identification for an image of a text block according to the present invention.

The identification of font type for image data corresponding to a block of text (i.e., the implementation of step S510) will now be discussed in detail with reference to FIG. 6. FIG. 6 is a flow diagram showing font type identification according to the present invention. Briefly, font type is determined by locating "key characters" in the text block, partitioning the text block into lines of text, determining for each line whether the characters in the line have fixed pitch or variable pitch, determining for each key character in the lines designated as variable pitch whether the character has a serif font or a sans serif font, and based on the fixed pitch/variable pitch and serif/sans serif determinations, designating a font type for the block of text.

In more detail, in step S601, characters in the block of text that correspond to characters in a predefined character set are identified as "key characters." The predefined character set is constructed such that each character in the set has a substantially straight left side (ignoring the presence of serifs). Preferably, the predefined character set is chosen such that the straight left side of each character in the set is substantially vertical (after removal of italic slant). In the preferred embodiment, two pre-defined character sets are used, one set for plain characters, and one set for italic characters, as follows:

Plain: b, h, i, k, l, m, n, p, r, u, B, D, E, F, H, I, K, L, M, N, P, R, U

Italic: b, h, k, m, n, p, r, u, B, D, E, F, H, I, K, L, M, N, P, R, U

Figure 8:
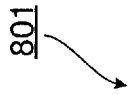
FIG. 8 depicts image data with key characters indicated for a representative text block.

FIG. 8 illustrates the operation of step S601, and shows an image of a sample text block 801, corresponding to block 6 in FIG. 1. For purposes of illustration, each character in text block 801 that corresponds to a character in the predefined character set is highlighted. The highlighted characters are thus "key characters." Character 802, an upright "l", is a "key character" because it corresponds to a character in the plain font style pre-defined character set. Character 804, an upright "a", is not a "key character" because it is not in the plain font style pre-defined character set. Character 805, an italic style "r", is a "key character" because it corresponds to a character in the italic font style pre-defined character set, but character 806, an "l" which also has an italic font style, is not a "key character" because it is not in the italic font style pre-defined character set.

The preferred embodiment identifies a font type for an image of a text block based on the maximum count value obtained by counting the number of characters that appear to be fixed pitch, variable pitch/serif and variable pitch/sans serif, respectively. Consequently, three font type counters are used: a fixed pitch counter (for counting the fixed pitch characters), a serif counter (for: counting the variable pitch/ serif characters), and a sans serif counter (for counting the variable pitch/sans serif characters).

Returning to FIG. 6, in step S602 all three font type counters are initialized to zero. In step S604, the first line of text in the text block image is selected.

In step S605, the current line of text in the text block image is evaluated, using a conventional fixed pitch determination algorithm, to determine whether the characters in the line have fixed pitch or variable pitch. Preferably, step S605 is performed by using an algorithm which functions substantially in the following manner. First, blank spaces in the text (such as spaces between words) are detected. Then, distances between the left edge of each character and the left edge of the first character to the right of such character (if any) are measured, omitting measurements corresponding at least in part to a blank space. Next, the standard deviation in the inter-character distances is calculated. Finally, a determination as to whether the line of text has fixed pitch or variable pitch is made based on the calculated standard deviation, such as whether the standard deviation exceeds 4.5 pixels.

If in step S605 it is determined that the characters in the line of text have fixed pitch, then flow branches to step S606 where the fixed pitch counter is incremented by the number of key characters in the line, and processing proceeds to step S611. Thus, referring to FIG. 8, if text line 810 is designated as fixed pitch, then because there are 14 key characters in the line, the fixed pitch counter is incremented by 14.

On the other hand, if step S605 determines that the line of text does not have fixed pitch, then flow proceeds to step S607. In step S607, for each key character in the line a determination is made as to whether a gap exists between the character's left border (as defined by the left side of the character's circumscribing rectangle obtained in step S507) and its left edge.

Figure 9A:
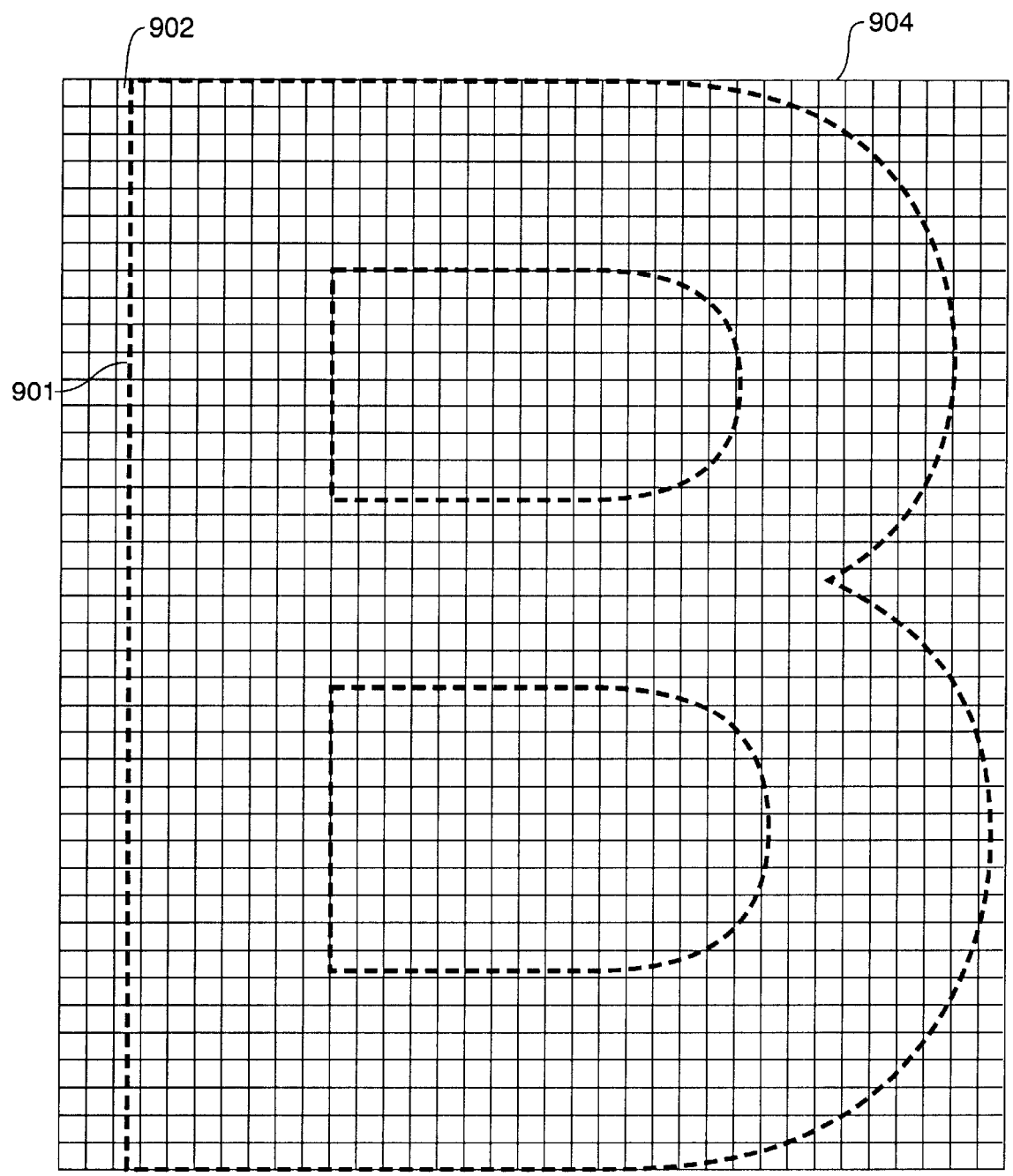
FIGS. 9A and 9B illustrate the measurement of horizontal gaps between the left border and the left edge of sans serif character "B".
Figure 9B:
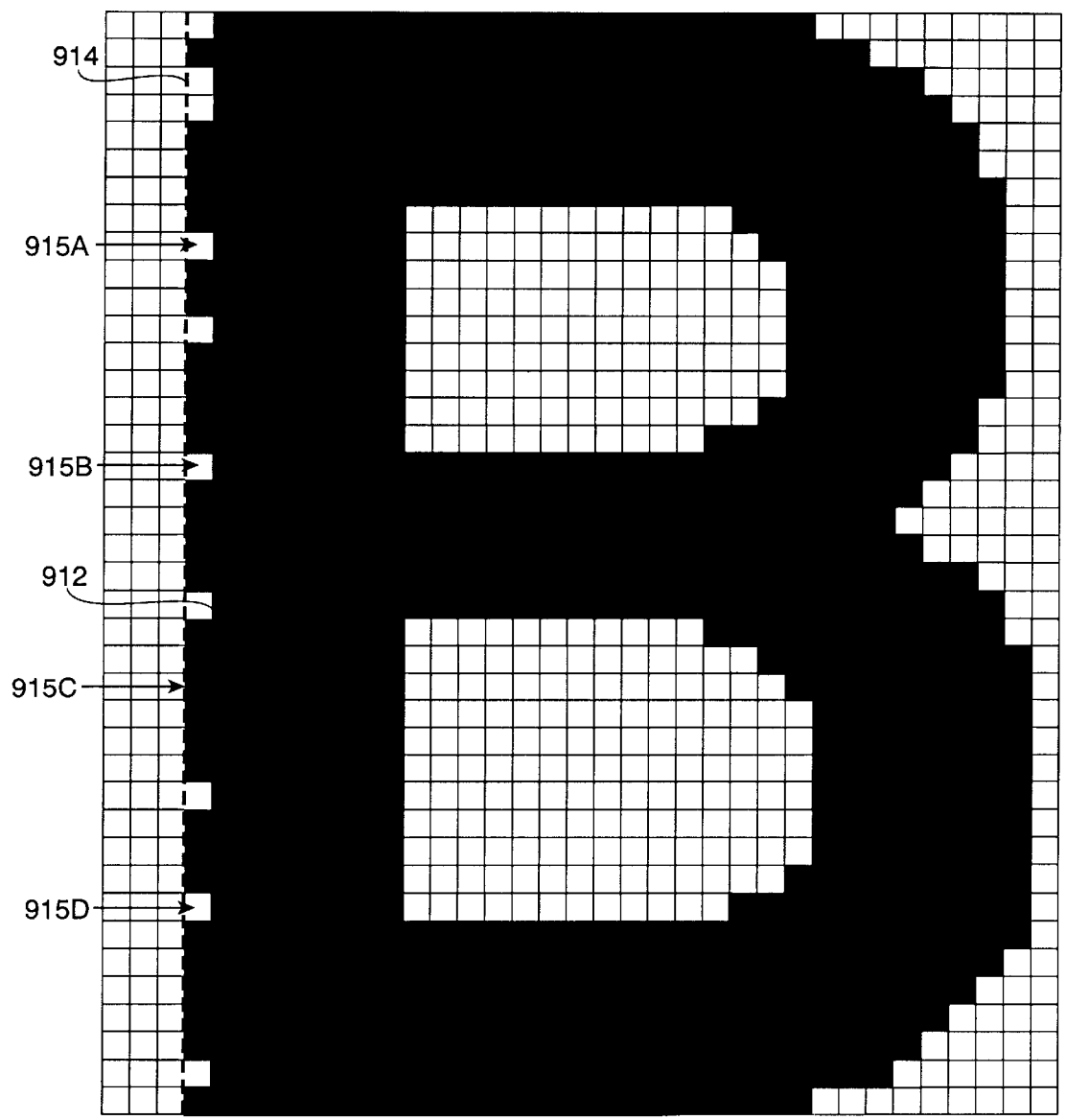
Figure 10:
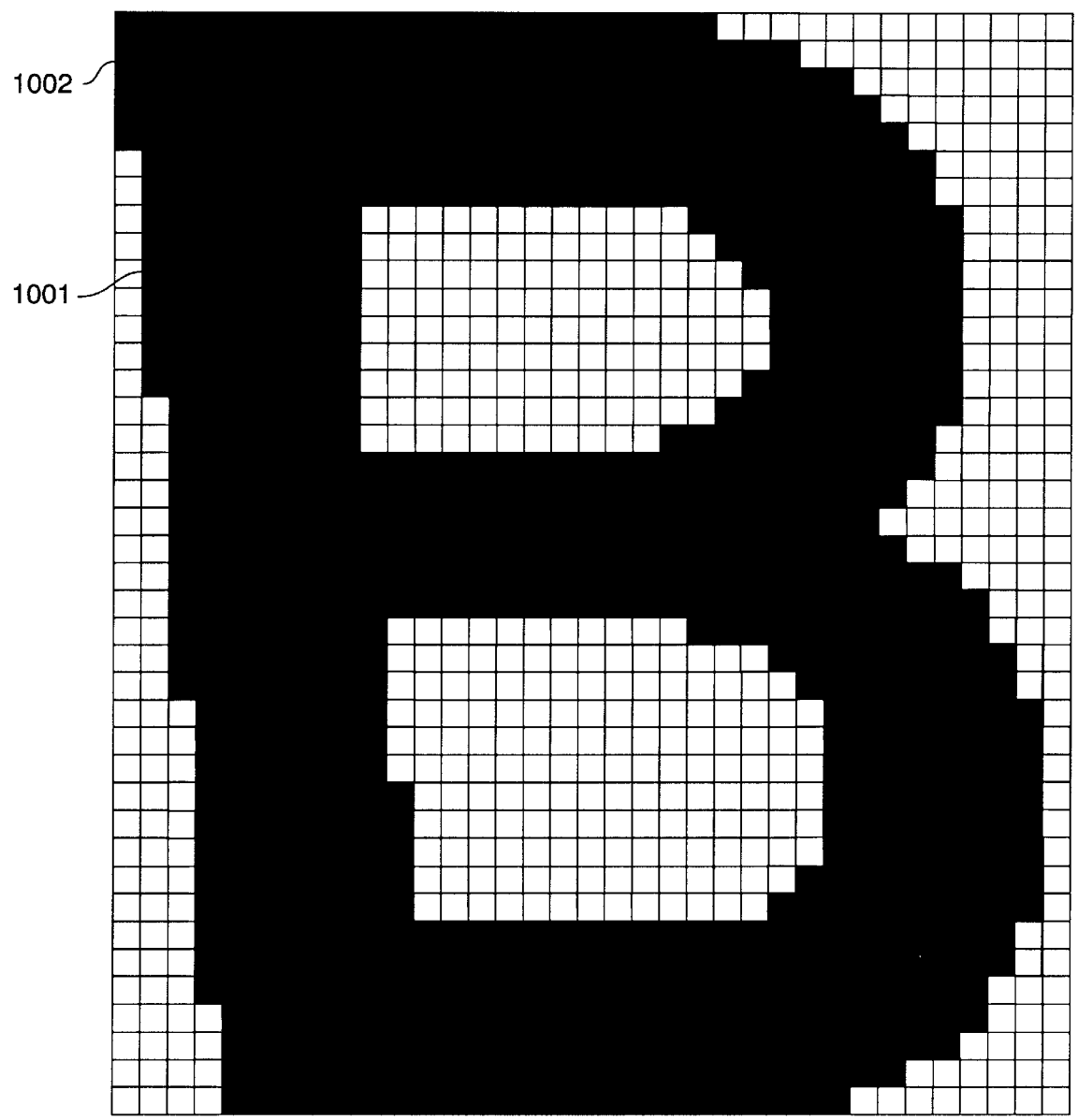
FIG. 10 is a view of a misaligned sans serif character "B", illustrating the effect of character slant on horizontal gap measurement.

Ideally, the determination could be made by simply detecting whether any white pixels exist immediately to the right of the left border. However, such a method might give rise to false serif identifications under a variety of circumstances. For example, FIG. 9A depicts sans serif character "B" with scanner pixel grid 904 superimposed. As shown in FIG. 9A, left character edge 901 is close to the middle of pixel column 902 in scanner pixel grid 904. FIG. 9B depicts pixel image data generated when the character shown in FIG. 9A is scanned according to scanner pixel grid 904. In such a case, as shown in FIG. 9B, the scanner might designate certain pixels along sampled character left edge 912 as black and others as white. As a result, white pixels will exist between left border 914 and sampled character left edge 912. Likewise, as shown in FIG. 10 which depicts pixel image data for a slant-corrected italic "B", if character edge 1001 is not perfectly rotationally aligned with left border 1002, such as if italic character slant removal in step S506 is imperfect, then white pixels might exist between left edge 1001 and left border 1002.

Figure 11:
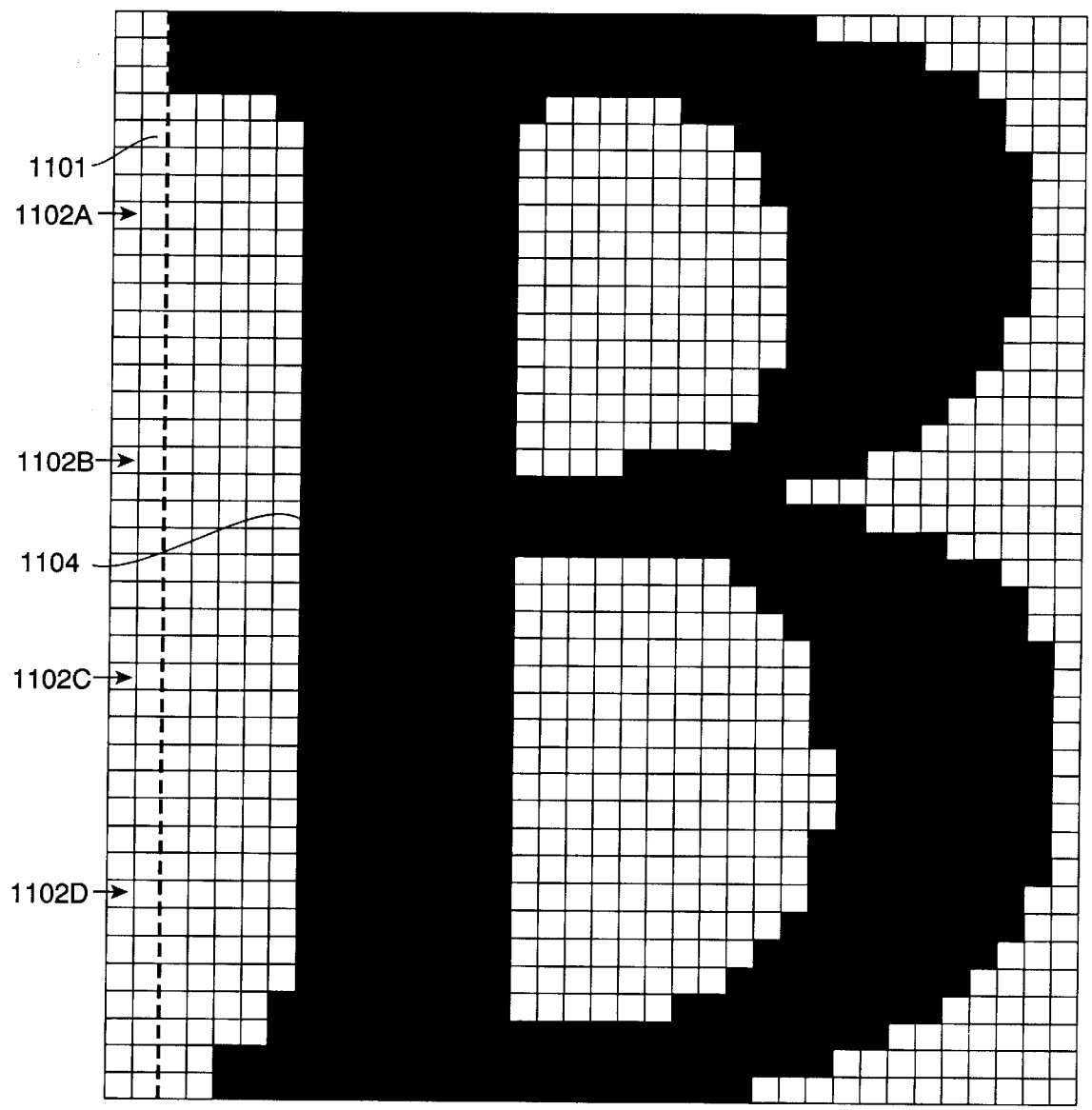
FIG. 11 illustrates the measurement of horizontal gaps between the left border and the left edge of serif character "B".

Consequently, in the preferred embodiment, gap determination is made by measuring horizontal gap lengths between the left borderland the left edge of the key character at four or five vertical positions intermediate between the top and the bottom of the character. Thus, as shown in FIG. 9B, horizontal gaps are measured between left border 914 and left edge 912 at intermediate vertical positions 915A through 915D. Similarly, FIG. 11 illustrates such measurements for the serif character "B", with horizontal distances being measured between left border 1101 and left character edge 1104 at vertical positions 1102A through 1102D.

In the preferred embodiment, the determination as to whether a gap exists is made by comparing the average of the horizontal gap lengths at the intermediate vertical positions to a threshold. If the average horizontal gap length exceeds the threshold, a gap is deemed to exist. Otherwise, a gap is deemed not to exist. The threshold used for each key character is dependent upon the key character's width (i.e., the width of the rectangular border for the key character), and is preferably approximately one-twentieth of the character width for plain style key characters and one-twelfth of the character's width for italic style key characters.

Also in the preferred embodiment, in order to maximize processing speed, the horizontal gap length at any intermediate vertical position is only checked to a certain maximum length, preferably approximately one-tenth of the character width for plain style key characters and one-sixth of the character width for italic style key characters. Thus, as shown in FIG. 11, although an actual gap of five pixels exists between left border 1101 and left character edge 1104 at intermediate vertical position 1102A, the length is only checked to a maximum length of 34/10=4 pixels.(after rounding up). Therefore, the gap length at position 1102A is determined to be 4 pixels.

The intermediate vertical positions are preferably uniformly spaced, with the lowest position at approximately 20% of the character height and the highest at approximately 80% of the character height for plain style key characters, and with the lowest position at approximately one-third of the character height and the highest position at approximately two-thirds of the character height for italic style key characters.

As shown in FIG. 9B, the horizontal gap lengths at positions 915A through 915D are 1, 1, 0 and 1 pixel, respectively. Because the average horizontal gap length (0.75 pixel) is less than one-twentieth of the character width (32/20=1.6 pixels), the determination is made that no gap exists. As shown in FIG. 11, the horizontal gap lengths at each of positions 1102A through 1102D is 5 pixels, which is greater than the maximum horizontal gap length (one-tenth of the character width, or 3.4 pixels). Therefore, as described above, each horizontal gap length is determined to be the maximum width. In this case, because the average horizontal gap length (4 pixels) exceeds one twentieth of the character width (34/20=1.7 pixels), a gap is deemed to exist.

In step S609 for each key character in the line for which it was determined in step S607 that a gap exists, the serif counter is incremented by one. In step S610 for each key character in the line for which it was determined in step S607 that no gap exists, the sans serif counter is incremented by one.

In step S611, a check is made as to whether any additional lines remain in the text block currently being processed. If there are any additional lines, then in step S612 the next line is selected, and processing control proceeds to step S605 to repeat the process for the current line.

When no additional lines remain, in step S614 a font type is identified for the entire text block in accordance with the highest count valued obtained.

The preferred embodiment of the present invention is capable of determining, for each text block in a document, a generic font type used in the original document. Consequently, when reproducing the document (step S511), a close match to the original document can be obtained based on the serif/sans serif and fixed pitch/variable pitch determinations made. Thus, in step S614, if the fixed pitch counter has the highest count value, the font type for the text block is designated as a fixed pitch serif font, and the block can be reproduced using a Courier font. If the serif counter is the highest, the font type for the text block is designated as a proportionally spaced serif font, and the block can be reproduced using a Times Roman font. If the sans serif counter is the highest, the font type for the text block is designated as a proportionally spaced sans serif font, and the block can be reproduced using a Helvetica font.

Although the foregoing describes the preferred embodiment of the invention, it will be apparent to one skilled in the art that many variations are possible, such as in methods for locating character borders and in the specific font types designated based on the serif/sans serif and fixed pitch/variable pitch determinations. Similarly, although in the preferred embodiment the serif/sans serif determination is made only for characters in lines designated as variable pitch, it is similarly apparent that the serif/sans serif determination of the present invention can also be made for fixed pitch text so as to distinguish between a fixed pitch serif font (such as Courier) and a fixed pitch sans serif font (such as Line Printer).

What is claimed is:

1. A method for determining from a pixel image of a character whether the character has a serif font or a sans serif font, comprising the steps of:

obtaining a position of pixels for a left border for the image of the character;

measuring plural lengths of blank pixels between the position of the left border and a position of a left edge of the character image, wherein each of the lengths corresponds to a number of blank pixels;

determining, based on a threshold and the measured lengths, whether a gap exists between the left edge of the character image and the left border of the character image; and designating the character as serif if said determining step determines, based on the threshold and the measured lengths, that a gap exists and sans serif if said determining step determines, based on the threshold and the measured lengths, that no gap exists.

2. A method according to claim 1, further comprising the step of obtaining a rectangle circumscribed around the character image, wherein the left border for the character image is the left side of the rectangle.

3. A method according to claim 1, wherein the left border for the character image is a line segment passing through a leftmost pixel of the character image.

4. A method according to claim 1, wherein the step of measuring plural lengths of blank pixels further comprises measuring the plural lengths of blank pixels at horizontal gaps between positions of the left border and positions of the left edge of the character image, the measurements of the plural lengths made at intermediate vertical positions between a top left and a bottom left pixel of the character image.

5. A method according to claim 4, wherein the determination as to whether a gap exists is made by comparing the average of the measured lengths to the threshold.

6. A method for determining a font type for plural characters from pixel image data that includes pixel images of the characters, comprising:

an accessing step of accessing a predefined character set consisting essentially of characters each having a substantially straight left edge;

a designating step of designating at least one character in the image data which matches a character in the predefined character set as a key character;

an obtaining step of obtaining a position of pixels for a left border for an image of each key character;

a measuring step of measuring, for each key character, plural lengths of blank pixels between the position of the left border and a position of a left edge for the image of each key character, wherein each of the lengths corresponds to a number of blank pixels;

a determining step of determining, based on a threshold and the measured lengths for each key character, whether a gap exists between the left edge of the image of the key character and the left border for the image of the key character;

an identifying step of identifying the font type for the characters in the image data based at least in part on whether the determining step determines that a gap exists for key characters.

7. A method according to claim 6, wherein the pre-defined character set includes characters having plural font styles, and wherein for each key character both the identity and the font style of the key character match the identity and font style of a character in the pre-defined character set.

8. A method according to claim 6, further comprising:
a first counting step of counting the key characters for which it is determined that a gap exists; and
a second counting step of counting the key characters for which it is determined that no gap exists,
wherein the identifying step identifies the font type for the characters in the image data based on a count value obtained in the first counting step and a count value obtained in the second counting step.

9. A method according to claim 6, further comprising a second obtaining step of obtaining for each key character image a rectangle circumscribed around the key character image, wherein the left border for each key character image is the left side of the rectangle circumscribed around the key character image.

10. A method according to claim 6, wherein the left border for the image of each key character is a line segment passing through a leftmost pixel of the key character image.

11. A method according to claim 6, wherein the measuring step measures, for each key character, the plural lengths of blank pixels at horizontal gaps between positions of the left border and positions of the left edge of the character image, the measurements of the plural lengths made at intermediate vertical positions between a top left and a bottom left pixel of the image for the key character.

12. A method according to claim 11, wherein the determination for each key character in the determining step is made by comparing the average of the measured lengths for the key character to the threshold.

13. A method according to claim 12, wherein the threshold for a key character is determined in accordance with the width of the darkened portion of the key character image.

14. A method according to claim 6, wherein the pre-defined character set contains only characters in which, after removal of any italic font style character slant, the substantially straight left edge is vertical.

15. A method according to claim 6, further comprising the-step of determining whether characters in the image data have fixed pitch, wherein the identifying step identifies the font type for the characters in the image data based on whether characters in the image data have fixed pitch.

16. A method according to claim 6, further comprising the step of printing the characters in the image data in the font type identified in said identifying step.

17. A method for determining a font type for plural characters from pixel image data that include pixel images of the characters, comprising:
a designating step of designating plural characters in the image data as key characters, wherein each key character has a substantially straight left edge;
a partitioning step of partitioning the image data into image segments;
a fixed pitch determining step of determining for each image segment whether the characters in the image segment have fixed pitch, and in accordance with that determination, designating the image segment as fixed pitch or variable pitch;
a border-obtaining step of obtaining a position of pixels for a left border for an image of each key character in the image segments designated as variable pitch;
a measuring step of measuring, for each key character in image segments designated as variable pitch, plural lengths of blank pixels between the position of the left border and a position of a left edge for the image of each key character, wherein each of the lengths corresponds to a number of blank pixels;
a gap determining step of determining, based on a threshold and the measured lengths for each key character in image segments designated as variable pitch, whether a gap exists between the left edge of the image of the key character and the left border for the image of the key character; and
an identifying step of identifying the font type for the characters in the image data based on determinations made in the fixed pitch determining step and the gap determining step.

18. A method according to claim 17, wherein each image segment consists of a single line of text.

19. A method according to claim 17, further comprising:
a first counting step of counting the key characters for which it is determined that a gap exists;
a second counting step of counting the key characters for which it is determined that no gap exists; and
a third counting step of counting the key characters in the image segments designated as fixed pitch,
wherein the identifying step identifies the font type for the characters in the image data in accordance with a maximum count value obtained in said first, second and third counting steps.

20. A method according to claim 17, further comprising the step of printing the characters in the image data in the font type identified in said identifying step.

21. An apparatus for determining from a pixel image of a character whether the character has a serif font or a sans serif font, said apparatus comprising:
a memory for storing the pixel image of the character and program instruction sequences; and
a processor for executing said program instruction sequences stored in said memory,
wherein said program instruction sequences include (a) a border obtaining step to obtain a position of pixels for a left border for the image of the character, (b) a measuring step to measure plural lengths of blank pixels between the position of the left border and a position of a left edge of the character image, wherein each of the lengths corresponds to a number of blank pixels, (c) a determining step to determine, based on a threshold and the measured lengths, whether a gap exists between the left edge of the character image and the left border of the character image, and (d) a designating step to designate the character as serif if said determining step determines, based on the threshold and the measured lengths, that a gap exists and sans serif if no gap exists.

22. An apparatus according to claim 21, wherein said program instruction sequences further include an obtaining step to obtain a rectangle circumscribed around the character image, wherein the left border for the character image is the left side of the rectangle.

23. An apparatus according to claim 21, wherein the left border for the character image is a line segment passing through a leftmost pixel of the character image.

24. An apparatus according to claim 21, wherein the measuring step measures the plural lengths of blank pixels at horizontal gaps between positions of the left border and positions of the left edge of the character image, the measurements of the plural lengths made at intermediate vertical positions between a top left and a bottom left pixel of the character image.

25. An apparatus according to claim 24, wherein the measuring step includes a comparing step to compare the average of the measured lengths to the threshold.

26. An apparatus for determining a font type for plural characters from pixel image data that include pixel images of the characters, said apparatus comprising:
- a memory for storing the pixel image data and program instruction sequences; and
- a processor for executing said program instruction sequences stored in said memory,
- wherein said program instruction sequences include (a) an accessing step to access a predefined character set consisting essentially of characters each having a substantially straight left edge, (b) a designating step to designate at least one character in the image data which matches a character in the predefined character set as a key character, (c) a border obtaining step to obtain a position of pixels for a left border for an image of each key character, (d) a measuring step to measure, for each key character, plural lengths of blank pixels between the position of the left border and a position of a left edge for the image of each key character, wherein each of the lengths corresponds to a number of blank pixels, (e) a determining step to determine, based on a threshold and the measured lengths for each key character, whether a gap exists between the left edge of the image of the key character and the left border for the image of the key character, and (f) an identifying step to identify the font type for the characters in the image data based at least in part on whether the determining step determines that a gap exists for key characters.

27. An apparatus according to claim 26, wherein the pre-defined character set includes characters having plural font styles, and wherein for each key character both the identity and the font style of the key character match the identity and font style of a character in the pre-defined character set.

28. An apparatus according to claim 26, wherein said program instruction sequences further include (a) a first counting step to count the key characters for which it is determined that a gap exists and (b) a second counting step to count the key characters for which it is determined that no gap exists, wherein the identification of font type in the identifying step is based on a count value obtained in the first counting step and a count value obtained in the second counting step.

29. An apparatus according to claim 26, wherein said program instruction sequences further include a second obtaining step to obtain for each key character image a rectangle circumscribed around the key character image, wherein the left border for each key character image is the left side of the rectangle circumscribed around the key character image.

30. An apparatus according to claim 26, wherein the left border for the image of each key character is a line segment passing through a leftmost pixel of the key character image.

31. An apparatus according to claim 26, wherein the measuring step measures, for each key character, the plural lengths of blank pixels at horizontal gaps between positions of the left border and positions of the left edge of the character image, the measurements of the plural lengths made at intermediate vertical positions between a top left and a bottom left pixel of the image for the key character.

32. An apparatus according to claim 31, wherein the determination for each key character in the determining step is made by comparing the average of the measured lengths for the key character to the threshold.

33. An apparatus according to claim 32, wherein the measuring step includes a threshold determining step to determine the threshold for the key character in accordance with the width of the darkened portion of the key character image.

34. An apparatus according to claim 26, wherein the pre-defined character set contains only characters in which, after removal of any italic font style character slant, the substantially straight left edge is vertical.

35. An apparatus according to claim 26, wherein said program instruction sequences further include a fixed pitch determining step to determine whether characters in the image data have fixed pitch, wherein identification of font type in the identifying step is based on whether characters in the image data have fixed pitch.

36. An apparatus according to claim 26, further comprising a printer, wherein said program instruction sequences further include a printing step to cause the printer to print the characters in the image data in the font type identified in said identifying step.

37. An apparatus according to claim 26, further comprising a scanner, wherein said program instruction sequences further include a scanning step to cause the scanner to scan in the image data.

38. An apparatus for determining a font type for plural characters from pixel image data that include pixel images of the characters, said apparatus comprising:
- a memory for storing the image data and program instruction sequences; and
- a processor for executing said program instruction sequences stored in said memory,
- wherein said program instruction sequences include (a) a designating step to designate plural characters in the image data as key characters, wherein each key character has a substantially straight left edge, (b) a partitioning step to partition the image data into image segments, (c) a fixed pitch determining step to determine for each image segment whether the characters in the image segment have fixed pitch, and in accordance with that determination, to designate the image segment as fixed pitch or variable pitch, (d) a border obtaining step to obtain a position of pixels for a left border for an image of each key character in the image segments designated as variable pitch, (e) a measuring step to measure, for each key character in image segments designated as variable pitch, plural lengths of blank pixels between the position of the left border and a position of a left edge for the image of each key character, wherein each of the lengths corresponds to a number of blank pixels, (f) a gap determining step to determine, based on a threshold and the measured lengths for each key character in the image segments designated as variable pitch, whether a gap exists between the left edge of the image of the key character and the left border for the image of the key character, and (g) an identifying step to identify the font type for the characters in the image data based on determinations made in the fixed pitch determining step and the gap determining step.

39. An apparatus according to claim 38, wherein each image segment consists of a single line of text.

40. An apparatus according to claim 38, wherein said program instruction sequences further include (a) a first counting step to count the key characters for which it is determined in the measuring step that a gap exists, (b) a second counting step to count the key characters for which it is determined in the measuring step that no gap exists, and (c) a third counting step to count the key characters in the image segments designated as fixed pitch, wherein the identification of font type in the identifying step is based on a maximum count value obtained in said first, second and third counting steps.

41. An apparatus according to claim 38, further comprising a printer, wherein said program instruction sequences further include a printing step to cause the printer to print the characters in the image data in the font type identified in said identifying step.

42. An apparatus according to claim 38, further comprising a scanner, wherein said program instruction sequences further include a scanning step to cause the scanner to scan in the image data.

43. Computer executable process steps to determine from a pixel image of a character whether the character has a serif font or a sans serif font, the process steps comprising:

a border obtaining step to obtain a position of pixels for a left border for the image of the character;

a measuring step to measure plural lengths of blank pixels between the position of the left border and a position of a left edge of the character image, wherein each of the lengths corresponds to a number of blank pixels;

a determining step to determine, based on a threshold and the measured lengths, whether a gap exists between the left edge of the character image and the left border of the character image; and a designating step to designate the character as serif if said determining step determines, based on the threshold and measured lengths, that a gap exists and sans serif if said determining step determines, based on the threshold and measured lengths, that no gap exists.

44. Computer executable process steps according to claim 43, further comprising an obtaining step to obtain a rectangle circumscribed around the character image, wherein the left border for the character image is the left side of the rectangle.

45. Computer executable process steps according to claim 43, wherein the left border for the character image is a line segment passing through a leftmost pixel of the character image.

46. Computer executable process steps according to claim 43, wherein the measuring step measures the plural lengths of blank pixels at horizontal gaps between positions of the left border and positions of the left edge of the character image, the measurements of the plural lengths made at intermediate vertical positions between a top left and a bottom left pixel of the character image.

47. Computer executable process steps according to claim 46, wherein the measuring step includes a comparing step to compare the average of the measured lengths to the threshold.

48. Computer executable process steps to determine a font type for plural characters from pixel image data that include pixel images of the characters, said process steps comprising:

an accessing step of accessing a predefined character set consisting essentially of characters each having a substantially straight left edge;

a designating step to designate at least one character in the image data which matches a character in the predefined character set as a key character;

a border obtaining step to obtain a position of pixels for a left border for an image of each key character;

a measuring step to measure, for each key character, plural lengths of blank pixels between the position of the left border and a position of a left edge for the image of each key character image, wherein each of the lengths corresponds to a number of blank pixels;

a determining step to determine, based on a threshold and the measured lengths for each key character, whether a gap exists between the left edge of the image of the key character image and the left border for the image of the key character; and an identifying step to identify the font type for the characters in the image data based at least in part on whether the determining step determines that a gap exists for key characters.

49. Computer executable process steps according to claim 48, wherein the pre-defined character set includes characters having plural font styles, and wherein for each key character both the identity and the font style of the key character match the identity and font style of a character in the pre-defined character set.

50. Computer executable process steps according to claim 48, further comprising:

a first counting step to count the key characters for which it is determined in the measuring step that a gap exists; and a second counting step to count the key characters for which it is determined in the measuring step that no gap exists, wherein the identification of font type in the identifying step is based on a count value obtained in the first counting step and a count value obtained in the second counting step.

51. Computer executable process steps according to claim 48, further comprising a second obtaining step to obtain for each key character image a rectangle circumscribed around the key character image, wherein the left border for each key character image is the left side of the rectangle circumscribed around the key character image.

52. Computer executable process steps according to claim 48, wherein the left border for the image of each key character is a line segment passing through a leftmost pixel of the key character image.

53. Computer executable process steps according to claim 48, wherein the measuring step measures, for each key character, the plural lengths of blank pixels at horizontal gaps between positions of the left border and positions of the left edge of the character image, the measurements of the plural lengths made at intermediate vertical positions between a top left and a bottom left pixel of the image for the key character.

54. Computer executable process steps according to claim 53, wherein the determination for each key character in the determining step is made by comparing the average of the measured lengths for the key character to the threshold.

55. Computer executable process steps according to claim 54, wherein the measuring step includes a threshold determining step to determine the threshold for the key character in accordance with the width of the darkened portion of the key character image.

56. Computer executable process steps according to claim 48, wherein the pre-defined character set contains only characters in which, after removal of any italic font style character slant, the substantially straight left edge is vertical.

57. Computer executable process steps according to claim 48, further comprising a fixed pitch determining step to determine whether characters in the image data have fixed pitch, wherein identification of font type in the identifying step is based on whether characters in the image data have fixed pitch.

58. Computer executable process steps according to claim 48, further comprising a printing step to print the characters in the image data in the font type identified in said identifying step.

59. Computer executable process steps to determine a font type for plural characters from pixel image data that include pixel images of the characters, comprising:

a designating step to designate plural characters in the image data as key characters, wherein each key character has a substantially straight left edge;

a partitioning step to partition the image data into image segments;

a fixed pitch determining step to determine for each image segment whether the characters in the image segment have fixed pitch, and in accordance with that determination, to designate the image segment as fixed pitch or variable pitch;

a border obtaining step to obtain a position of pixels for a left border for an image of each key character in the image segments designated as variable pitch;

a measuring step to measure, for each key character in image segments designated as variable pitch, plural lengths of blank pixels between the position of the left border and a position of a left edge the image of for each key character, wherein each of the lengths corresponds to a number of blank pixels;

a gap determining step to determine, based on a threshold and the measured lengths for each key character in image segments designated as variable pitch, whether a gap exists between the left edge of the image of the key character image and the left border for the image of the key character; and an identifying step to identify the font type for the characters in the image data based on determinations made in the fixed pitch determining step and the gap determining step.

60. Computer executable process steps according to claim 59, wherein each image segment consists of a single line of text.

61. Computer executable process steps according to claim 59, further comprising:

a first counting step to count the key characters for which it is determined in the measuring step that a gap exists;

a second counting step to count the key characters for which it is determined in the measuring step that no gap exists; and a third counting step to count the key characters in the image segments designated as fixed pitch, wherein the identification of font type in the identifying step is based on a maximum count value obtained in said first, second and third counting steps.

62. Computer executable process steps according to claim 59, further comprising a printing step to print the characters in the image data in the font type identified in said identifying step.

63. A method according to claim 6, wherein the obtaining, measuring and determining steps are performed only for key characters.

64. A method according to claim 17, wherein the obtaining, measuring and gap determining steps are performed only for key characters.

65. An apparatus according to claim 26, wherein the border obtaining, measuring and determining steps are performed only for key characters.

66. An apparatus according to claim 38, wherein the border obtaining, measuring and gap determining steps are performed only for key characters.

67. Computer executable process steps according to claim 48, wherein the border obtaining, measuring and determining steps are performed only for key characters.

68. Computer executable process steps according to claim 59, wherein the border obtaining, measuring and gap determining steps are performed only for key characters.

69. A method according to claim 1, wherein the threshold is dependent on a width of a portion of the character image.

70. A method according to claim 69, wherein a rectangle circumscribes the character image, the width of a portion of the character image corresponds to the width of the rectangle.

71. A method according to claim 69, wherein the width of a portion of the character image corresponds to a width of a darkened portion of the character image.

72. A method according to claim 6, wherein the threshold is dependent on a width of a portion of the character image.

73. A method according to claim 72, wherein a rectangle circumscribes the character image, the width of a portion of the character image corresponds to the width of the rectangle.

74. A method according to claim 72, wherein the width of a portion of the character image corresponds to a width of a darkened portion of the character image.

75. A method according to claim 17, wherein the threshold is dependent on a width of a portion of the character image.

76. A method according to claim 75, wherein a rectangle circumscribes the character image, the width of a portion of the character image corresponds to the width of the rectangle.

77. A method according to claim 75, wherein the width of a portion of the character image corresponds to a width of a darkened portion of the character image.

78. An apparatus according to claim 21, wherein the threshold is dependent on a width of a portion of the character image.

79. An apparatus according to claim 78, wherein a rectangle circumscribes the character image, the width of a portion of the character image corresponds to the width of the rectangle.

80. An apparatus according to claim 78, wherein the width of a portion of the character image corresponds to a width of a darkened portion of the character image.

81. An apparatus according to claim 26, wherein the threshold is dependent on a width of a portion of the character image.

82. An apparatus according to claim 81, wherein a rectangle circumscribes the character image, the width of a portion of the character image corresponds to the width of the rectangle.

83. An apparatus according to claim 81, wherein the width of a portion of the character image corresponds to a width of a darkened portion of the character image.

84. An apparatus according to claim 38, wherein the threshold is dependent on a width of a portion of the character image.

85. An apparatus according to claim 84, wherein a rectangle circumscribes the character image, the width of a portion of the character image corresponds to the width of the rectangle.

86. An apparatus according to claim 84, wherein the width of a portion of the character image corresponds to a width of a darkened portion of the character image.

87. Computer-executable process steps according to claim 43, wherein the threshold is dependent on a width of a portion of the character image.

88. Computer-executable process steps according to claim 87, wherein a rectangle circumscribes the character image, the width of a portion of the character image corresponds to the width of the rectangle.

89. Computer-executable process steps according to claim 87, wherein the width of a portion of the character image corresponds to a width of a darkened portion of the character image.

90. Computer-executable process steps according to claim 48, wherein the threshold is dependent on a width of a portion of the character image.

91. Computer-executable process steps according to claim 90, wherein a rectangle circumscribes the character image, the width of a portion of the character image corresponds to the width of the rectangle.

92. Computer-executable process steps according to claim 90, wherein the width of a portion of the character image corresponds to a width of a darkened portion of the character image.

93. Computer-executable process steps according to claim 59, wherein the threshold is dependent on a width of a portion of the character image.

94. Computer-executable process steps according to claim 93, wherein a rectangle circumscribes the character image, the width of a portion of the character image corresponds to the width of the rectangle.

95. Computer-executable process steps according to claim 93, wherein the width of a portion of the character image corresponds to a width of a darkened portion of the character image.

* * * * *

UNITED STATES PATENT AND TRADEMARK OFFICE
CERTIFICATE OF CORRECTION

PATENT NO.    : 6,496,600 B1
DATED         : December 17, 2002
INVENTOR(S)   : Hung Khei Huang It is certified that error appears in the above-identified patent and that said Letters Patent is hereby corrected as shown below:

Column 1,
Line 58, "exist." should read -- exists. --.

Column 4,
Line 46, "715.," should read -- 715, --.

Column 7,
Line 18, "lengths" should read -- length --.

Column 15,
Line 17, "edge the image of for" should read -- edge of the image for --.

Signed and Sealed this

Eleventh Day of November, 2003

JAMES E. ROGAN
*Director of the United States Patent and Trademark Office*